United States Patent
Kunii et al.

(10) Patent No.: US 7,702,006 B2
(45) Date of Patent: Apr. 20, 2010

(54) ADJUSTMENT OF TRANSMISSION DATA RATE BASED ON DATA ERRORS AND/OR LATENCY

(75) Inventors: Atsushi Kunii, Tokyo (JP); Takayuki Shirahama, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 11/172,986

(22) Filed: Jul. 5, 2005

(65) Prior Publication Data

US 2007/0009015 A1    Jan. 11, 2007

(51) Int. Cl.
*H04B 1/38* (2006.01)
(52) U.S. Cl. ...................................................... 375/221
(58) Field of Classification Search .................. 375/219, 375/221, 224, 225, 227, 228, 358; 455/69
See application file for complete search history.

(56) References Cited

U.S. PATENT DOCUMENTS

| | | | |
|---|---|---|---|
| 6,205,120 B1 * | 3/2001 | Packer et al. | 370/235 |
| 6,707,862 B1 * | 3/2004 | Larsson | 375/326 |
| 2002/0106070 A1 * | 8/2002 | Elsey et al. | 379/218.01 |
| 2004/0146027 A1 * | 7/2004 | Shinozaki et al. | 370/335 |

* cited by examiner

*Primary Examiner*—Sam K Ahn
(74) *Attorney, Agent, or Firm*—Merchant & Gould

(57) ABSTRACT

Aspects of the present disclosure are directed to providing flexible and efficient communication by dynamically adjusting a transmit data rate in response to data status feedback. Such feedback may include information regarding data errors and/or latency. A first communication node communicates with a second communication node and sends data at an initial data rate. The transmit data rate is then selectively adjusted based on data status feedback received from the second communication node or other destination.

9 Claims, 3 Drawing Sheets

| Current Data Rate (X) 400 | Video Quality 401 |
|---|---|
| ≤ 48 kbps | 80x60 pixels resolution; 5 fps |
| 48 kbps < X ≤ 100 kbps | 80x60 pixels resolution; 10 fps |
| 100 kbps < X ≤ 200 kbps | 106x80 pixels resolution; 10 fps |
| 200 kbps < X ≤ 600 kbps | 160x120 pixels resolution; 10 fps |
| 600 kbps < X | 320x240 pixels resolution; 20 fps |

ADJUSTMENT OF TRANSMISSION DATA RATE BASED ON DATA ERRORS AND/OR LATENCY

BACKGROUND

New hardware and software technology, as well as increased availability of broadband, are all leading to increased data traffic across networks and the Internet. Instead of accessing simple, text-based web pages, users are employing data intensive applications. Internet users are viewing video content offered by news organizations, streaming high-quality audio from Internet radio stations, and sharing live audio and video over peer-to-peer networks. These applications, and particularly real-time video applications, rely on a continuous connection having sufficient and consistent bandwidth, even though different users may have disparate data rates available to them. This preventing the content provider (e.g., a peer or a web page server) from using a one-size-fits-all approach. A dial-up modem user may have a 56 kbps connection, while a cable modem user may have almost ten times the bandwidth with a 512 kbps connection.

Content servers have typically dealt with this in the past by requiring users to input the speed of their connection prior to sending the data. The content provider could then tailor the data it sends based on the speed chosen by the user. If the user indicated a 56 k connection, then a lower quality video presentation would be sent at a lower data rate, whereas if the user indicated a broadband connection, then a higher quality presentation would be sent at a higher data rate. A number of popular media players give users the ability to select the speed of their connection, which is then communicated to any software application that attempts to access the player.

In peer-to-peer communication, this discrepancy is often dealt with by agreeing to a fixed data rate at the beginning of a communications session. For example, conventional video conferencing devices often agree to a particular fixed data rate at the beginning of a video conferencing connection. Often, this data rate will be the lowest common denominator of the various peers involved in the video conference.

The inventors have found that requiring the data rate to be fixed up front is in many cases inflexible and inefficient. The wrong speed may be selected. Or, the available bandwidth (such as the bandwidth provided by an intervening network) may vary during the communications session. Variable available bandwidth may be caused by noise or network problems. If the fixed transmit data rate is continued after the available bandwidth has decreased, it is likely that the data will be subject to errors and excessive latency by the time it reaches the destination, if ever. Especially in the case of live video transmissions, video data that is delayed en route to the receiving party may be considered outdated and thrown out.

SUMMARY

For any type of data communications, and particularly for real-time transmissions such as live video data, there is a need for dealing with the above limited bandwidth considerations. One way to deal with these limitations is to be able to dynamically and/or continuously adjust the transmit data rate (e.g., bit rate and/or video frame rate) during a transmission session to account for changes in available and/or needed bandwidth as they occur. Accordingly, aspects of the present disclosure are directed to providing this capability. This may allow for significantly more flexible and efficient communication than where the transmit data rate is fixed.

Further aspects of the disclosure are directed toward a first communication node that communicates directly or across a network with a second communication node, wherein the first communication node sends data at an initial data rate and later adjusts the data rate based on feedback received from the second communication node and/or the network. Once data has begun to be transmitted at the initial data rate, or after a change in the data rate, the first communication node enters a monitoring period. During this monitoring period, the first communication node monitors a data status. The first communication node may continue to transmit data during the monitoring period. Based on the data status, the first communication node may decide from among either maintaining the current data rate, increasing the data rate, or decreasing the data rate.

The data status may include data error and/or latency information. For example, in the case of video data, data errors may include missing and/or corrupted video frames. Also, because high latency may indicate that impending errors may occur if the data rate is maintained or increased, providing latency information to the first communication node may allow it to make better informed data rate adjustment decisions. For instance, the first communication node may choose to adjust the data rate in response to any data error being detected, at least a threshold amount of data error being detected, and/or at least a threshold amount of latency being detected. After each change in the data rate, the communication node may then, using a lookup table, adjust a data property other than the data rate (e.g., the video quality and/or format), based on the data rate. This approach may avoid requiring user input prior to transmission, and may further allow for a more optimal data rate throughout the duration of the data transmission.

These and other features of the disclosure will be apparent upon consideration of the following detailed description of illustrative embodiments.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Figure 1:
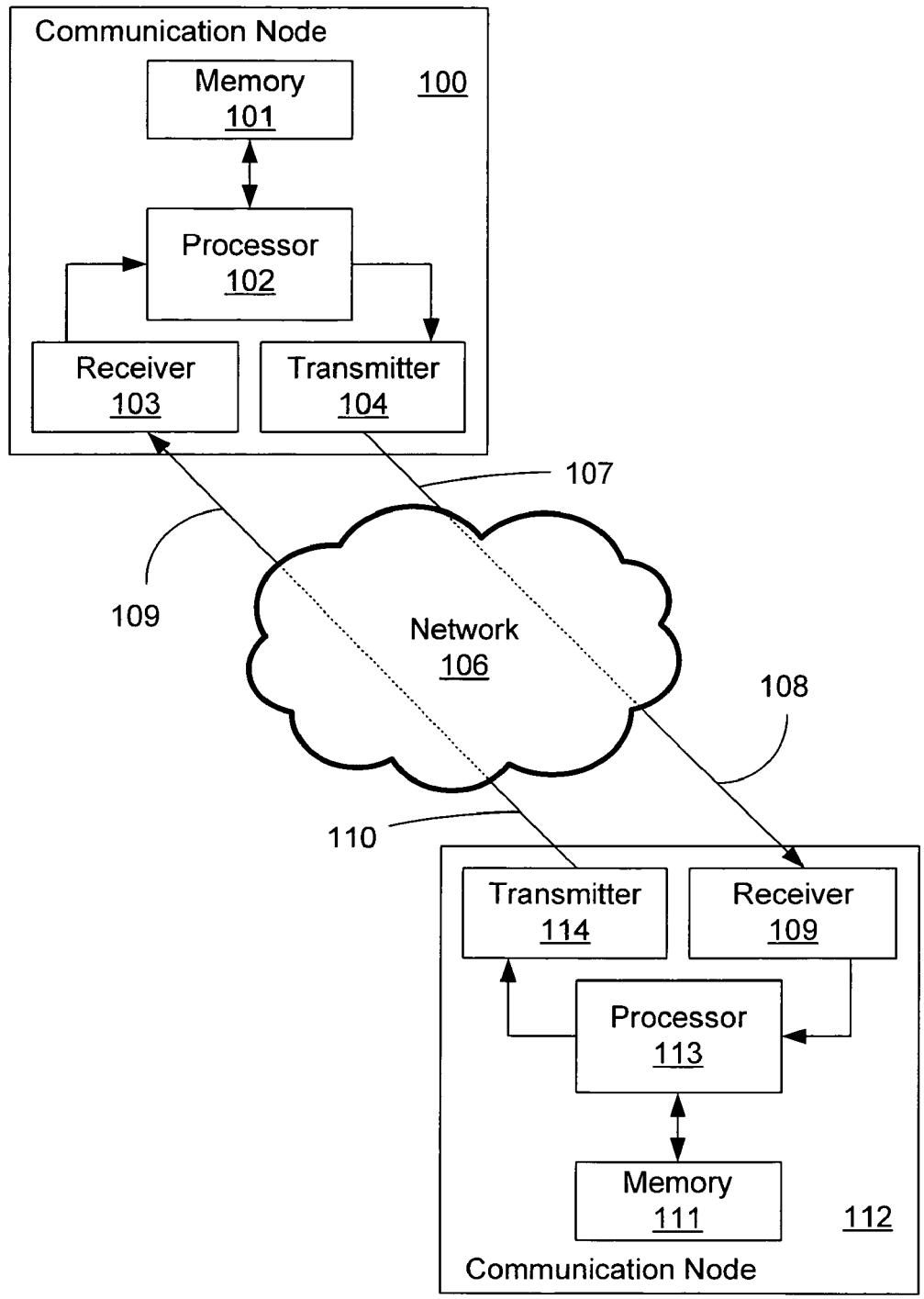
FIG. 1 is a functional block diagram of a communications system including two illustrative communication nodes coupled together via an intervening network.

FIG. 1 is a functional block diagram of two illustrative communication nodes 100, 112 coupled via a network 106. The first communication node 100 as shown includes a transmitter 104, a receiver 103, a processor 102, and a memory 101. The second communication node 100 as shown includes a transmitter 114, a receiver 115, a processor 113, and a memory 111. The first communication node 100 may stand alone or be part of a device such as a personal computer, video game unit, video player, audio player, digital consumer electronics device, cellular phone or other type of telephone, and/or personal digital assistant (PDA). The first communication node 100 may be implemented as hardware, software in the form of computer-executable instructions stored on one or more computer-readable media, and/or firmware, in the form of one or more separate modules.

One or more additional communication nodes (not shown) may also be coupled to the network 106. The description of the first communication node 100 above and throughout this specification may, depending upon the particular embodiment, apply to any or all of the other communication nodes, including the second communication node 112.

The network 106 may be configured in any fashion that allows bi-directional communication between the first communication node 100 and the second communication node 112, including, but not limited to, an Internet Protocol (IP) network such as the Internet, a wired network, a wireless network, a telephone landline network, a cellular phone network, a local area network (LAN), a wide area network (WAN), a satellite network, and/or a proprietary network. In addition to being coupled together via the network 106, the first communication node 100 and the second communication node 112 may also have a direct connection between them. Like the first communication node 100 and the second communication node 112, any or all of the nodes coupled to the network 106 may be configured to communicate with any or all of the other nodes coupled to the network 106, as desired.

As also shown in FIG. 1, data 107 is transmitted from the first communication node 100 and received as data 108 by the second communication node 112, and data 110 is transmitted from the second communication node 112 and received as data 109 by the first communication node 100. Data 107, 108, 109, and 110 may each be any type of data, including, but not limited to, ASCII data, HTML data, binary data, picture data, audio data, and/or video data. Additionally, the data may or may not be real-time data.

Figure 2:
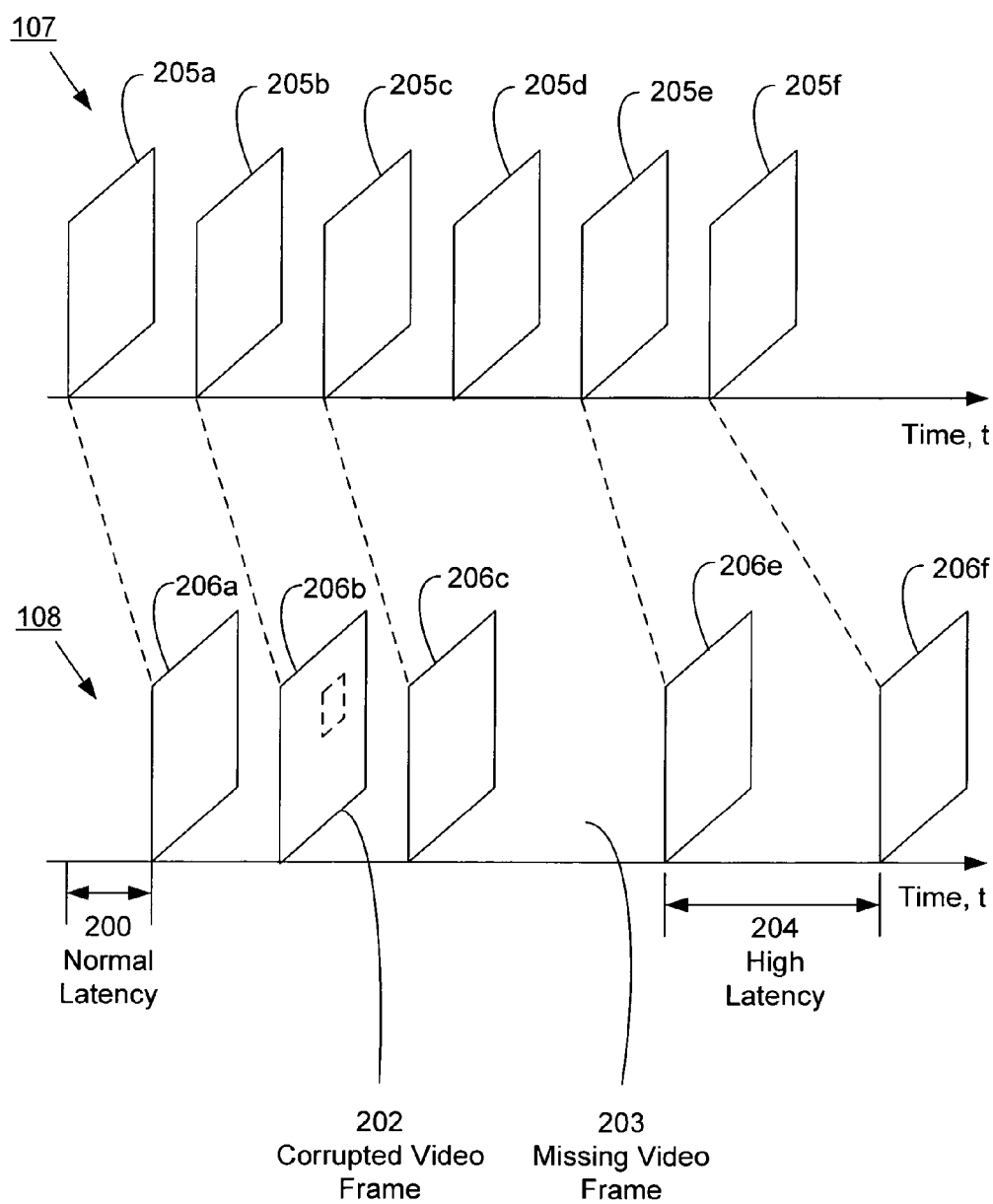
FIG. 2 shows illustrative video frames traveling from a transmitter to a receiver.

FIG. 2 shows an example of data 107 being a real-time video data transmission. In this example, data 107 may be organized in a conventional manner as a time series of video frames 205a-205f that are transmitted from transmitter 104 of communication node 100. Data 108 also includes a time series of video frames 206a,b,c,e,f that each correspond to a different one of the video frames 205a,b,c,e,f. Displaying the video and/or audio corresponding to the data making up each frame 205 or 206 in sequence creates an audiovisual presentation. Ideally, data 107 and data 108 contain the same data content (e.g., the same video data content). However, due to various errors and/or delays that may occur, this may not always be the case. It should be noted that video data may be in a variety of known formats that are not necessarily organized in the manner illustratively shown; any data format may be used herein.

FIG. 2 shows a few problems that may cause video frames 205 to differ from video frames 206: missing video frames 203, corrupted video frames 202, and high latency 204. In the present example, a missing frame 203 occurs when data corresponding to an entire video frame (in this case, video frame 206c) fails to arrive at the receiver 115 in a timely fashion. This includes video frames that never arrive at the destination, or highly latent video frames as discussed below. Missing video frames may be caused by, for example, the network 106 reaching a maximum bandwidth such that there is simply no more room for a particular video frame or other piece of data to be sent over the network 106. A data error 202 in this example occurs when a portion of a particular video frame is missing or corrupted. For example, a video frame may be transmitted in the form of a plurality of network packets containing video data and one or more error-checking packets containing data that is the exclusive-OR of the video data. In this case, since there is some data redundancy built in, when one or more of the video data packets is missing or corrupted, the video frame can correct the missing data or corrupted data from the other packets. Data errors may result from, e.g., such as noise and/or intermittent bandwidth limitations.

Another type of problem that may occur in transmitting data 108 is high latency 204. Latency between a source and a destination is the delay between the time when a given piece of data leaves a source and when it arrives at the destination. In this example, latency may be measured such that the destination is the network 106 (or some point within the network 106) or the second communication node 112. Latency may be measured at any data level, such as on a frame-by-frame, packet-by-packet, or byte-by-byte basis. There is always some latency that occurs in any normal transmission. For example, it may be expected that there is a normal latency 200 that occurs when one of the video frames 205 is transmitted through the network 106 until it arrives as one of the video frames 206 at the second communication node 112. High latency occurs when the delay exceeds than the normal latency 200. The normal latency may be considered a single threshold value or a range of normal values. For example, a high latency 204 is shown in FIG. 2, where the amount of time that it takes for transmitted video frame 205f to arrive at the second communication node 112 as received video frame 206f is higher than normal. Unexpectedly high latency may cause substantial problems, especially in real-time communications scenarios. Sufficiently high latency may cause data to be dropped even though it may be eventually received, because the late data may no longer considered relevant by the time it reaches its destination. Even where latency is high, yet not high enough to trigger actual problems such as dropped video frames, such high latency is often a good predictor of whether data errors are imminent.

Although the previous example was directed to a video frame scenario, similar problems may occur in connection with any type of data transmission. In general, data errors may occur, which include missing and/or corrupted data, and high latency may occur. Either of these problems may be caused by the transmission being sent at such a data rate that more bandwidth is required than is available or advisable. This often occurs where the available bandwidth that the network 106 allocates at any given time to the transmission of data 107 is close to, or even less than, the actual bandwidth used by the transmission. The available bandwidth may depend upon a variety of factors, such as a service level agreement between the provider of the network 106 (or the provider of access to the network 106), the current usage level of the network 106, and/or noise on the network 106 and/or any connections to the network 106. For example, assume that data 107 is being transmitted into network 106 at a transmission data rate, and network 106 is able to transfer data 107 across the network 106 at up to a higher network data rate. If the network data rate is substantially higher than the transmission data rate, then very few data problems should be expected. However, if the network data rate is only slightly higher than the transmission data rate, then occasional data errors and/or high latency may become more likely. If the network data rate is lower than the transmission data rate, then data errors and/or high latency become much more likely.

Because the network data rate (i.e., the maximum bandwidth that the network 106 is presently able to provide for the transmission of data 107 through the network 106) may change over time and/or is unknown, it may be desirable to adjust the transmission data rate. Adjustment of the transmission data rate may depend upon the network data rate. However, since the network data rate is not necessarily known to the first communication node 100, it may be desirable to provide information about whether the transmission of data 107 is successful, contains an error, or is excessively latent. In other words, it would be useful to provide feedback regarding the status of the transmission of data 107 into and/or through the network 106 and/or of the data 108 as received by the second communication node 100.

Such data status may be provided by the second communication node 112. For instance, the receiver 109 of the second communication node 112 may receive data 108, and the processor 113 would analyze the received data 108 for latency and/or data errors. Based on this analysis, the processor 113 would control the transmitter 114 to transmit data 110, which would contain the data status that is received in data 109 by the receiver 103 of the first communication node 100. There are various known ways of measuring data errors and latency of received data, and any of these methodologies may be used.

Figures 3, 4:
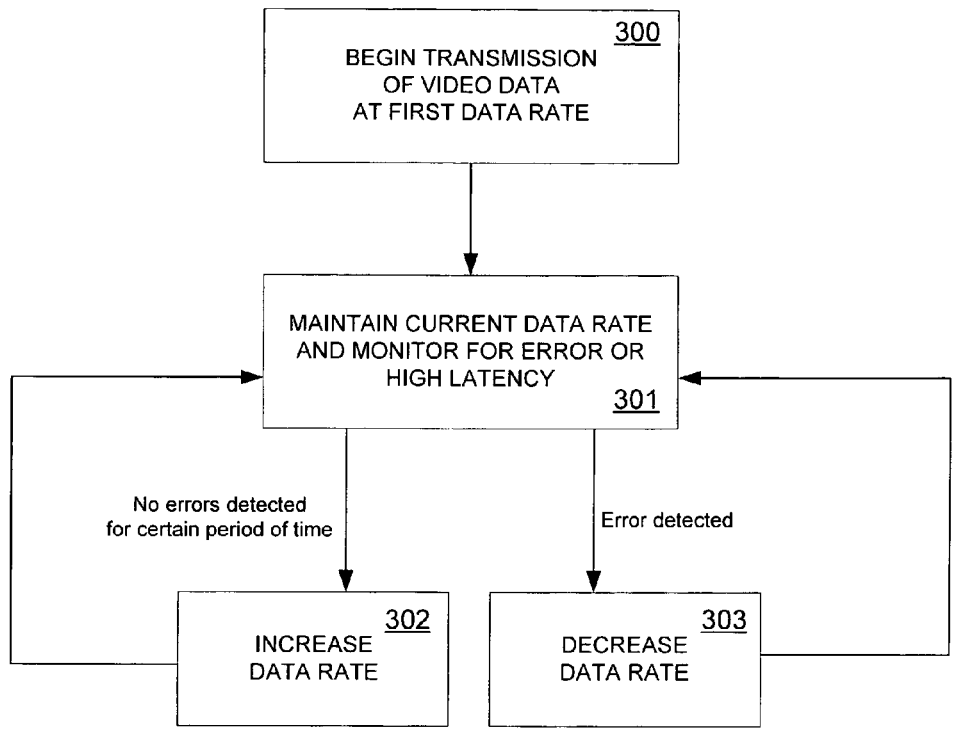
FIG. 3 is a flowchart of an illustrative process for controlling the transmission data rate.
FIG. 4 shows an illustrative look-up table for choosing a video quality based on a given data rate.

Referring to the flowchart of FIG. 3, the first communication node 100 relies on data status that is fed back to the first communication node 100, to control the transmission rate of data 107. The data status includes information about data errors and/or latency. FIG. 3 is a flow chart showing illustrative steps that may be taken to adjust the data rate of video data 107 being transmitted from the first communication node 100 to the second communication node 112 based on the data status. FIG. 3 may apply to a data transmission from any communication node to any one or more other communication nodes. The data rate may be adjusted in order to maximize the data rate, to maximize stability of the transmission, or for any other reason.

Initially, in step 300, the processor 102 controls the transmitter 104 to begin transmission of the video data at a first data rate. The first data rate may be a predetermined minimum data rate, or the first data rate may be a predetermined data rate greater than the minimum possible data rate. The first data rate may be set exclusively by the first communication node 100 or in accordance with an agreement protocol between the first communication node 100, the network 106, and/or the second communication node 112. For example, the first data rate may be set to 100 kbps.

Next, in step 301, the transmitter 104 maintains the first data rate for a certain period of time, which will be referred to hereinafter as the "monitoring period." During the monitoring period, the processor 102 monitors the data status contained in feedback data 109 received by the receiver 103. Referring to the example of FIG. 2, the data status may include information regarding missing frames 203, corrupted video frames 202, latency 200, 204, and/or any other type of information regarding the success and/or failure of transmitting the data 107 and receiving the corresponding data 108 at the other side of the network 106. The data status may be generated by the second communication node 112, by the network 106, or by some other data/network monitoring device. The data status is sent to the first communication node 100 through the network 106 or via some other path. In the shown example, the data status is sent as data 110 from the transmitter 114 of the second communication node 112 and received as data 109 at the receiver 103 of the first communication node 100.

The duration of each monitoring period may always be the same or it may vary based on the data status. For example, the monitoring period may initially be about twenty seconds in length and then about five seconds in length for each subsequent monitoring period. Where the monitoring period is variable, the monitoring period may be shorter during the initial phase in order to raise the data rate to a more desirable rate relatively quickly. The monitoring period may later become longer responsive to the data rate having reached a threshold rate or depending upon the particular data status.

During the monitoring period, the processor 102 listens to the data status that is fed back to the receiver 103 to determine whether a data error and/or high latency has occurred. A data error may be considered to have occurred if any amount of data error occurs at all, or alternatively only if at least a threshold amount of error has occurred. High latency may be considered to have been experienced if at least a threshold amount of latency is experienced.

Responsive to determining that a data error and/or high latency has occurred, in step 303 the processor 102 controls the transmitter 104 to decrease the transmission data rate of data 107. The transmission data rate may be decreased to the most recent transmission data rate used previously or by a predetermined decrement to a transmission data rate that may or may not necessarily result in the previous transmission data rate. The amount of the predetermined decrement may be a fixed amount, calculated based on the particular data status, and/or calculated based on some other factor. After a decrease in the transmission data rate, the first communication node 100 starts a new monitoring period where it again monitors the data status.

If, however, during the monitoring period, no data errors are detected and the latency remains below a certain threshold, then in step 302, the processor 102 controls the transmitter 104 to increase the transmission data rate. The transmission data rate may be increased each time by any amount. For example, the transmission data rate may be increased by a fixed increment, by a predetermined amount based on the current transmission data rate, by a predetermined increment based on whether a data error and/or high latency has previously occurred, by an amount based on data from the network 106 and/or the second communication node 112, and/or by any other amount. After an increase in the transmission data rate, the first communication node 100 again continues the monitoring period, for example every fifth second, in step 301, where it again monitors the data status.

Although the method shown in FIG. 3 has been discussed with regard to a specific series of monitoring periods, alternatively the first communication node 100 may always be continuously monitoring the data status. For example, the processor 102 may continuously and simultaneously monitor the data status and adjust the transmit data rate accordingly.

As previously mentioned, adjustments of other properties of data 107 may also be made along with adjustments to the transmission rate of data 107. For instance, where data 107 is video data, the transmitted video quality (e.g., resolution, number of colors, video frame rate, and/or any other video quality parameter) may be based on the data transmission rate. FIG. 4 shows an illustrative lookup table that may be used by the processor 102 to choose a video quality based on the data transmission rate. Video quality may be defined using one or more parameters. For example, video quality may be defined by a particular encoding bit rate, video resolution (e.g., number of pixels), video frame rate, and/or color depth (e.g., bits per pixel). Any particular data transmission rate 400 or range of data transmission rates may correspond to a particular video quality 401. In this example, when the data transmission rate is higher, a higher video quality is used, and when data rates are lower, a lower video quality is used. For example, when the data transmission rate is at 100 kbps, the corresponding video quality may be set at 106×80 pixels per video frame with a video frame rate of 10 frames per second (fps). This feature may improve optimization of the video data communication. The lookup table may be used with each change in the data rate or less frequently. Alternatively, the processor 102 may choose the video quality or other data property based directly on the data status as received by the receiver 103.

The above-mentioned functionality may be implemented as computer-executable instructions that are part of one or more software applications and/or in the operating system itself, and/or as hardware, and/or as firmware. The computer-executable instructions, in the examples given, may be stored in the memories 101 and/or 111 and may be executed by the processors 102 and/or 113, as appropriate. For instance, computer-executable instructions for performing the steps described in connection with FIG. 3 may be stored in the memory 101 and executed by the processor 102.

Thus, a way to dynamically adjust the data transmission rate of a communication node has been described, based on monitoring the status of the data that has been transmitted. Such status may be provided as feedback to the communication node, from the network itself or from the ultimate recipient of the transmitted data. It is also noted that, while the transmission function has been described with reference to the first communication node 100 and the feedback function has been described with reference to the second communication node 112, both such functions may be performed by both communication nodes 100, 112, in a symmetrical communication scenario such as an audio/video chat session. For example, both the first communication node 100 and the second communication node 112 may be transmitting video to each other and receiving video from each other, simultaneously. In this case, each of the communication nodes 100, 112 would dynamically adjust their respective data transmission rates in response to data status as reported by the other communication node.

What is claimed is:

1. A computer-readable storage medium that stores a set of computer-executable instructions which when executed by a computer perform a method for transmitting data over a network at an adjustable data rate, the method comprising:
    sending, by a data transmitter, data comprising video data at a data rate;
    monitoring for a determined period of time a status of the data as received by a destination, wherein the determined period of time is based on the status of the data received by the destination and wherein the status of the data comprises latency information;
    adjusting a video quality of the video data based on the data rate; and
    choosing a new data rate as, after the determined period of time, one from among increasing the data rate, decreasing the data rate, and maintaining the data rate based on the status of the data.

2. The computer-readable storage medium of claim 1, wherein choosing comprises choosing to decrease the data rate responsive to the latency information indicating a latency that exceeds a threshold amount of latency.

3. The computer-readable storage medium of claim 1, further comprising increasing the data rate responsive to determining, based on the status of the data, that there are no data errors and no high latency during the determined period of time.

4. A method for transmitting data over a network at an adjustable data rate, the method comprising:
    sending, by a data transmitter, data comprising video data at a data rate;
    monitoring for a determined period of time a status of the data as received by a destination, wherein the determined period of time is based on the status of the data received by the destination and wherein the status of the data comprises latency information;
    adjusting a video quality of the video data based on the data rate; and
    choosing a new data rate as, after the determined period of time, one from among increasing the data rate, decreasing the data rate, and maintaining the data rate based on the status of the data.

5. The method of claim 4, wherein choosing comprises choosing to decrease the data rate responsive to the latency information indicating a latency that exceeds a threshold amount of latency.

6. The method of claim 4, further comprising increasing the data rate responsive to determining, based on the status of the data, that there are no data errors and no high latency during the determined period of time.

7. A system for transmitting data over a network at an adjustable data rate, the system comprising:
    a transmitter configured to transmit data comprising video data at a data rate;
    a processor configured to monitor, for a determined period of time, a status of the data as received by a destination, wherein the determined period of time is based on the status of the data received by the destination and wherein the status of the data comprises latency information;
    the processor further configured to adjust a video quality of the video data based on the data rate; and
    the processor further configured to choose a new data rate as, after the determined period of time, one from among increasing the data rate, decreasing the data rate, and maintaining the data rate based on the status of the data.

8. The system of claim 7, wherein the processor being further configured to choose comprises the processor being further configured to decrease the data rate responsive to the latency information indicating a latency that exceeds a threshold amount of latency.

9. The system of claim 7, wherein the processor being further configured to choose comprises the processor being further configured to increase the data rate responsive to determining, based on the status of the data, that there are no data errors and no high latency during the determined period of time.

* * * * *